Aug. 26, 1930.                W. LA HODNY                1,773,736
                        MOUNTING FOR PLATE MIRRORS
                            Filed May 21, 1929

Inventor
William La Hodny
By Poppy Powers
Attorneys

Patented Aug. 26, 1930

1,773,736

UNITED STATES PATENT OFFICE

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK

MOUNTING FOR PLATE MIRRORS

Application filed May 21, 1929. Serial No. 364,926.

This invention relates to a mounting, frame or holder for mirrors which are more particularly intended for use on automobiles outside of the passenger compartment for observing the road in rear of the car and are therefore generally known as outside rear vision mirrors.

Mirrors of this character as heretofore constructed consisted generally of a circular frame and a reflecting plate arranged within the frame. Owing to the fact that the glass from which the mirror plates are made varies, it has been the practice heretofore to make the frames sufficiently deep to accommodate the thickest glass which is likely to be used in the manufacture of the mirror plate and whenever the glass mirror plates were less than the maximum in thickness then one or more washers or fillers of paper or other materials were used to take up the space between the frame and the mirror plate for producing a tight fit between the same. This is not only expensive on account of the extra time required to mount a mirror plate of this kind in a frame but it is also objectionable on account of the liability of marring the mirror and also the necessity of using cement for holding the mirror plate against displacement in the frame or holder.

It is therefore the object of this invention to provide a mounting, frame or holder for mirror plates which is adaptable to mirror plates varying in thickness and permits of mounting the same without requiring any washers for taking up slack space nor cement for retaining the plates against displacement in the frame and to accomplish this purpose by means which are simple and inexpensive in construction, neat in appearance and capable of being easily assembled and produced at low cost.

In the accompanying drawings.

In the following description similar characters of reference indicate like parts in the several figures of the drawings.

Figure 1:
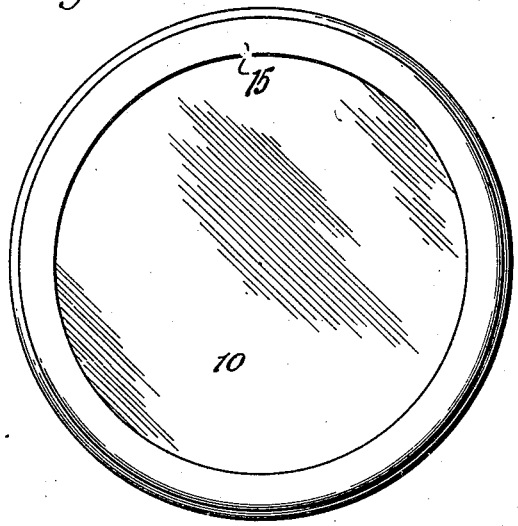
Fig. 1 is a front view of a mirror embodying my improvements.

The reflecting body of the mirror preferably consists of a transparent circular glass plate 10 provided on its rear side with a reflecting coating 11 such as nitrate of silver.

The frame, holder, or mounting of the mirror is made of sheet metal and consists of two sections which are connected with each other.

The rear frame section consists of an inner annular wall 12 extending circumferentially around the edge of the reflecting plate and a back 13 formed integrally with the rear edge of said inner wall and bearing against the rear side of the reflecting plate.

The front frame section consists of an outer annular wall 14 surrounding the inner annular wall of the rear frame section and forming a telescopic joint therewith, and an annular resilient flange 15 projecting inwardly from the front edge of said outer annular wall and bearing against the marginal part of the front side of said reflecting plate. This flange 15 inclines rearwardly and is adapted to be deflected forwardly more or less depending on the thickness of the glass of the reflecting plate which is mounted on the frame.

The front and rear sections of the frame are connected with each other by a locking device which is preferably so constructed that when the wall of the front frame section is pushed into rearmost position over the wall of the rear section the frame sections will become fastened to each other automatically. This fastening or locking device in its preferred form consists of a plurality of locking lugs 16 projecting laterally outward from the annular wall of the front frame section and each having an inclined front face or side 18 and an abrupt rear face or side 19, and an internal circumferential groove 17 formed on the inner side of said outer wall and receiving said locking lugs of the inner wall.

Figure 2:
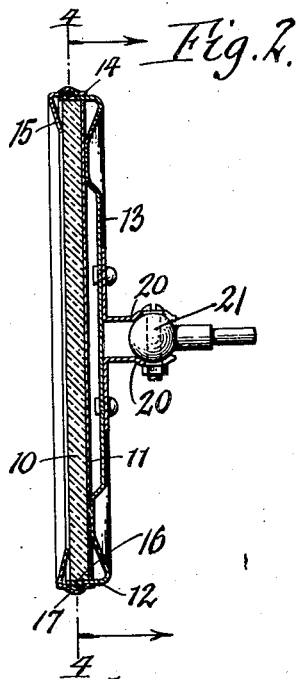
Fig. 2 is a cross section of the same taken at right angles to the plane of the mirror plate and showing a mirror plate which is comparatively thin.
Figure 4:
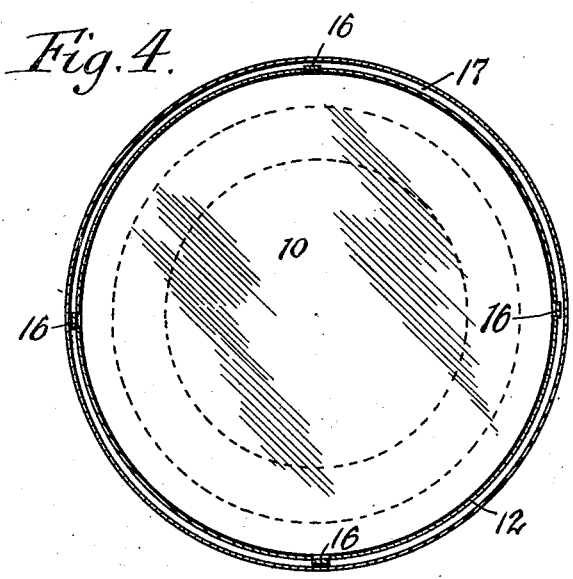
Fig. 4 is a section taken on line 4—4, Fig. 2.

In assembling the parts of the mirror the reflecting plate is first inserted into the rear frame section so that the rear side of this plate bears against the front side of the back wall. The front frame section is then pushed rearwardly over the rear frame section until the locking lugs of the rear section spring into the locking groove of the front section whereby the frame sections are interlocked. While applying the front frame section to the rear frame section the resilient annular flange of the front section upon engaging with the front side of the reflecting plate will be deflected forward from its maximum inclined position to a more or less straightened position depending on the thickness of the glass plate. In Fig. 2, this plate is comparatively thin in which case the resilient flange is bent forwardly only a moderate extent, while in Fig. 3, the glass plate is somewhat thicker and therefore causes the resilient flange to be bent forwardly to a greater extent.

In all cases, however, the resilient flange will bear against the glass plate with sufficient pressure that this flange will be under tension and cause the glass plate, regardless of whether it is thick or thin, to be gripped between this flange and the frame back and hold the plate against displacement without requiring any paper washers or fillings or the like to be placed between the plate and the back, nor any cement to be used between the plate and the frame to avoid looseness between these members.

The construction of the frame is thereby materially simplified and the assemblage of the parts facilitated and thereby effect a considerable economy in production, as well as producing an article which is neat in appearance.

Figure 3:
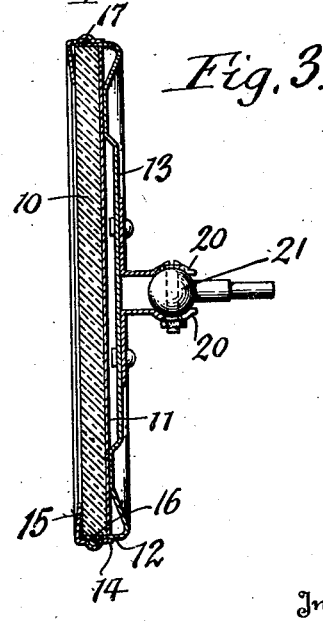
Fig. 3 is a similar view showing a mirror plate which is comparatively thick.
Figure 5:
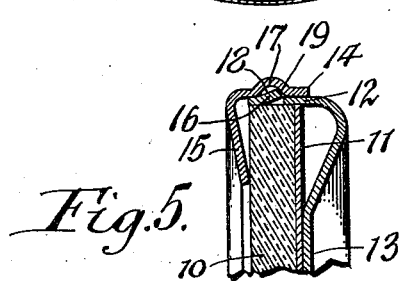
Fig. 5 is a fragmentary section similar to Figs. 2 and 3, on an enlarged scale.

Any suitable means may be employed for mounting this mirror on a support, for example, a pair of friction jaws 20, 20 gripping opposite sides of a ball 21 forming part of a supporting bracket, as shown in Figs. 2 and 3.

I claim as my invention:

A mounting for supporting a disk shaped mirror reflecting plate, comprising a frame receiving said plate and consisting of rear and front annular sections, said rear section consisting of an inner annular wall extending around the edge of the plate and provided with a plurality of laterally extending projections each of which has an inclined front side and an abrupt rear side and a back connected with the rear edge of said inner wall, and said front section consisting of an outer annular wall surrounding said inner wall and having an internal annular groove which receives said projections and provided on its front edge with an inwardly projecting annular resilient flange bearing against the marginal part of the front side of said plate.

In testimony whereof I hereby affix my signature.

WILLIAM LA HODNY.